United States Patent [19]

Frantz

[11] 4,131,442

[45] Dec. 26, 1978

[54] PNEUMATIC COMPACTOR FOR PARTICULATE DESICCANT

[75] Inventor: Lanier Frantz, Salem, Va.

[73] Assignee: Graham-White Sales Corporation, Salem, Va.

[21] Appl. No.: 792,451

[22] Filed: Apr. 29, 1977

[51] Int. Cl.² .............................................. B01D 39/00
[52] U.S. Cl. ....................................... 55/387; 55/475; 55/316
[58] Field of Search .................. 55/267, 218, 312–314, 55/316, 302, 387, 475

[56] References Cited

U.S. PATENT DOCUMENTS

| | | | |
|---|---|---|---|
| 3,131,040 | 4/1964 | Dunn et al. ............................... | 55/33 |
| 3,464,186 | 9/1969 | Hankison et al. ....................... | 55/316 |
| 3,832,831 | 9/1974 | Ritchie et al. .......................... | 55/218 |
| 3,876,400 | 4/1975 | Franz ...................................... | 55/314 |
| 4,026,685 | 5/1977 | Grix ........................................ | 55/218 |
| 4,029,486 | 6/1977 | Frantz ..................................... | 55/316 |

*Primary Examiner*—Bernard Nozick
*Attorney, Agent, or Firm*—Wilmer Mechlin

[57] ABSTRACT

In a compressed gas filter unit including a housing and, for selective filtering, a particulate desiccant packed in a canister removably seatable from below in a central bore of the housing, a pneumatic compactor automatically charged in any filtering cycle of the filter unit and acting upwardly on the desiccant and therethrough on the canister for compacting the desiccant and pressing the canister fluid-tight against a seat therefor at the upper end of the bore.

6 Claims, 2 Drawing Figures

PNEUMATIC COMPACTOR FOR PARTICULATE DESICCANT

BACKGROUND OF THE INVENTION

As pointed out in my copending application Ser. No. 661,307, filed Feb. 25, 1976, and the application of Virgil L. Frantz on a Dual Filter Assembly, Ser. No. 766,437, filed Feb. 7, 1977, a particulate desiccant, while highly efficient in selectively adsorbing from compressed gas an entrained component, such as moisture, due to the rubbing together of the desiccant particles, tends to release dust into the gas being filtered, usually to the detriment of devices activated by the filtered gas. This tendency is minimized by including in the filter unit a pneumatic compactor such as disclosed in my application Ser. No. 661,307. However, if, as illustrated in that application, the compactor acts through an interposed floating follower on the desiccant, in a direction opposite that in which the canister is inserted in the housing, given a high pressure, high flow installation such as in the above Virgil L. Frantz application, the effect on the canister containing the desiccant can be to displace the canister from its seat in the housing sufficiently to permit a substantial portion of the compressed gas introduced for filtering into the housing of the filter unit, to bypass the desiccant and be discharged without filtering from the housing. It is with preventing this phenomenon, that the compactor of the present application is particularly concerned.

SUMMARY OF THE INVENTION

The primary object of the present invention is to provide a pneumatic compactor for use in a compressed gas filter unit which is effective to minimize the tendency of a particulate desiccant to produce dust and in process press a canister containing the desiccant into sealing engagement with the seat therefore in the filter unit's housing.

Another object of the invention is to provide an improved pneumatic compactor for a filter unit of a compressed gas filter assembly which is automatically charged during a filtering cycle of the unit for both compacting a particulate desiccant and pressing a canister containing the desiccant against its seat in the unit's housing, is manually dischargeable for facilitating removal of the canister for periodic maintenance during a regenerating cycle of the unit, applies pressure to both the desiccant and the canister by a pneumatically actuated piston swivelly connected to a floating follower in the canister, and is itself removably mounted in the housing for periodic maintenance.

Other objects and advantages of the invention will appear hereinafter in the detailed description, be particularly pointed out in the appended claims and be illustrated in the accompanying drawings, in which:

FIGURE DESCRIPTION

FIG. 1 is a central vertical sectional view of a housing of a filter unit showing a preferred embodiment of the improved compactor of the present invention incorporated in the housing; and FIG. 2 is a horizontal sectional view taken along lines 2—2 of FIG. 1.

DETAILED DESCRIPTION

Figure 1:
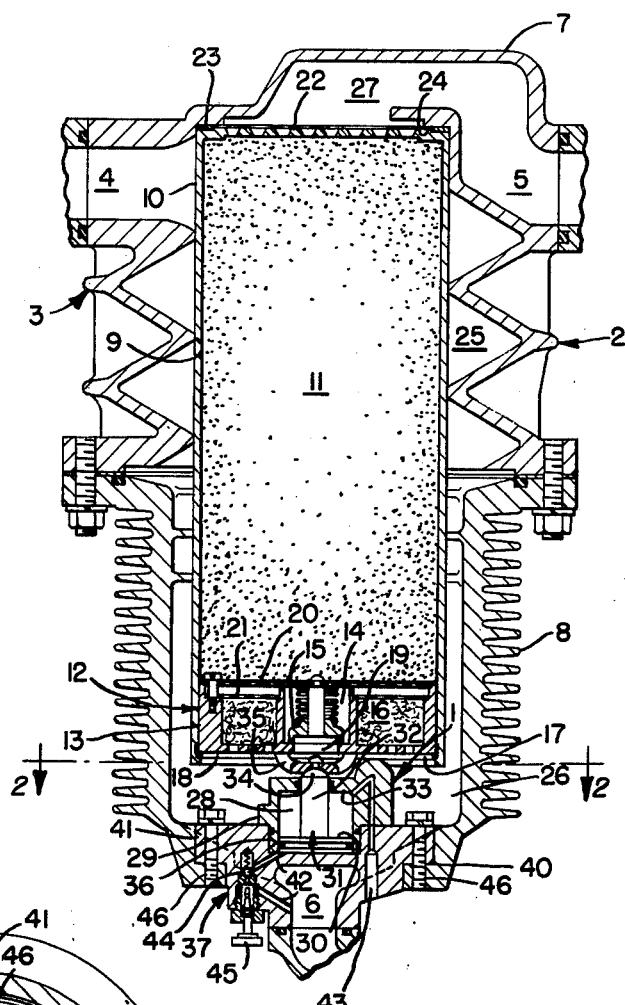

Referring now in detail to the drawings in which like reference characters designate like parts, the improved pneumatic compactor of the present invention, designated as 1, is adapted for automatically compacting particulate material when compressed gas for actuation is available, and particularly designed for use in a filter unit of a compressed gas filter assembly in which its ability to both compact a desiccant packed in a canister and maintain sealing engagement of the canister with its seat in the unit's housing are advantageous. As typical of an installation having such requirements, the impoved compactor has been illustrated applied to a filter unit of a dual filter assembly, such as disclosed in the above-mentioned Virgil L. Frantz application.

Figure 2:
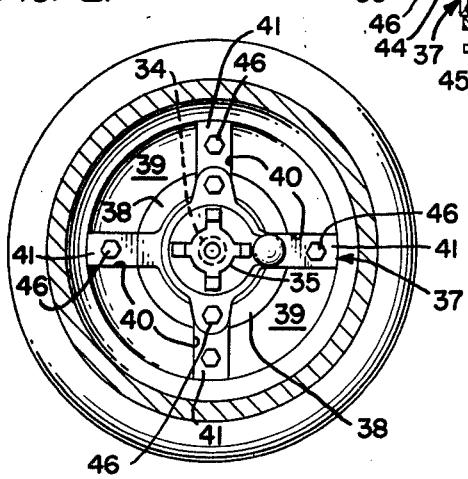

Not only does the present application borrow from the above Virgil L. Frantz application the setting for a preferred embodiment of the compactor 1 of the present invention in the form of a suitably generally cylindrical, vertically disposed housing 2 of one of the filter units 3 of a dual filter assembly, such as shown in said Frantz application in FIG. 2 or 4, but the assembly of the latter application utilizes the compactor 1 of this invention. Since not necessary for an understanding of the present invention, the housing 2 has been illustrated without the valving at its inlet, outlet and drain ports, 4, 5 and 6, respectively. ordinarily required in the operation of the housing 2 as part of a filter unit 3 and typified by the valving disclosed in the previously mentioned Virgil L. Frantz application. As in the latter application, the housing 2 of the exemplary installation has upper and lower parts, 7 and 8, respectively, releasably connected, or attached as by bolting, and both preferably externally ribbed for improved dissipation of heat to ambient air. A cylindrical central vertical bore 9 in the housing 2, common to both of the parts 7 and 8 and exposed on disconnection, thereof, removably receives or seats a suitably cylindrical canister or container 10 mainly packed with or containing a particulate material 11, which, for use in a filter unit, desirably is a fine bead or particle desiccant, most suitably a molecular sieve adapted to selectively adsorb moisture or other contaminant entrained in and desired to be separated from the compressed gas to be filtered in the particular installation.

In balance, the illustrated canister 10 contains below or in advance of the desiccant column or bed 11, a scrubber or scrubbing device 12 including a casing 13 slidable axially in the canister 10 and having therein a central bypass passage 14 normally closed by a check valve 15. The scrubber 12 is intended to remove or entrap fine oil or like particles from the compressed gas being filtered in advance of the desiccant and performs this function by a suitably stainless steel annular wool pad 16 received or seated in the casing 13 around and spaced radially outwardly of the central passage 14. Removably held in the canister 10, conveniently by a snap ring 17, the scrubber's casing 13 has a suitably integral bottom or base plate 18 having a normally closed central orifice 19 opening into the bypass passage 14 and, outwardly thereof, being foraminous or perforated for passing compressed gas undergoing filtering to and through the pad 16. A foraminous end plate 20 at and removably attached to the upper or downstream end of the casing 13, separates the desiccant column 11 and the scrubber 12 and is prevented or barred from directly contacting the pad 16 by an intermediate annular spacer plate 21, spaced below the separator plate 20, to prevent oil trapped in the pad from being drawn by capillary attraction into the desiccant bed 11 through the separator plate.

The canister 10 itself has a perforated or foraminous upper end 22 seating upwardly against and peripherally engageable through an interposed annular sealing gasket 23 with an opposed annular shoulder or canister seat 24 in the housing 2 at the upper or downstream end of the bore 9.

Dirty or contaminated compressed gas enters or is introduced, injected or passed into the housing 2 through the inlet port 4 and led therefrom into a downwardly directed helical passage 25 in the housing's upper part 7 between confronting sides thereof and the canister 10. The cyclonic flow induced in the entering compressed gas by the helical passage 25, which centrifugally cools and separates heavier contaminants from the incoming gas, is broken up by internal baffling in the housing's lower part 8 as the gas flows past the bottom portion of the canister 10 to an underlying sump 26 in the lower part. The sump collects the previously separated contaminants and reverses the direction of flow of the compressed gas for upward flow through the canister 10 to an overlying outlet passage 27 in the upper end of the housing 2 leading to the outlet port 5 from which the gas exits or is discharged as filtered or decontaminated product compressed gas. So operating in a filtering cycle, the filter unit 3, in a draining or regenerating or purging cycle, has its inlet and outlet ports 4 and 5 closed except for a restricted reverse flow at low pressure of previously filtered gas through the canister 10 and the then open outlet port 6 to ambient air for regenerating or purging both the desiccant 11 and the scrubber pad 16.

As mentioned in both my copending application and the application of Virgil L. Frantz, earlier referred to, the constant exposure of the particles or beads of the preferred molecular sieve desiccant 11 to gas flowing first in one direction and then in the other, ordinarily causes the particles to abrade or rub against each other and produce dust which is carried off by the filtered gas to the detriment of any operating devices on which the product gas is used. Too, in a filter assembly, such as illustrated, in which the canister 10 separates the outlet port 5 from the inlet port 4, it is vital that sealing engagement between the downstream, here upper, end 22 of the canister 10 and its seat 24 in the housing 2 at the upper end of the bore 9, be maintained, at least during the filtering cycle of the filter unit 3, to prevent a substantial portion of the compressed gas injected into or entering the housing 2 from being shunted past the canister from the inlet port directly to the outlet port and discharged, unfiltered, from the latter port.

Even with the circumferential O-ring seal of Lanier Frantz application, Ser. No. 661,307, and, as there illustrated, the compactor acting in a direction to dislodge or unseat the canister, no particular problem is presented in truck, bus and rapid transit car installations, since the gas pressures usually obtaining or prevailing in such installations are insufficient to disrupt the seal between the canister and the housing. However, under higher gas pressures, such as present in diesel locomotive compressed air filter assemblies, the application of compacting pressure to the desiccant 11 in a direction to dislodge the canister 10 from its seat 24, renders substantial leakage around the dowstream end of the canister likely, regardless of the type of gasket employed for sealing. In the present invention, the possibility of such leakage is avoided without adverse effect upon the compacting action of the compactor 1 upon the desiccant beads 11, by applying the compacting pressure in the seating direction of the canister 10 and applying that pressure through the canister to a resilient or compressible gasket 23 interposed between the seat 24 and the confronting end 22 of the canister.

In the illustrated preferred embodiment, the improved pneumatic compactor 1 is comprised of a valve chamber 28 in an open-bottomed cup or container 29 in which rides or slides axially, here vertically, a head 30 of a piston 31 the stem 32 of which projects upwardly through the cup's upper wall 33 and has a ball-shaped upper or outer end 34 ball-and-socket connected to and swivelly mounting a self-aligning spider 35 straddling the central orifice 19 in and engaging the bottom plate 18 of the scrubber's casing 13. With the scrubber 12 then serving as an intervening floating follower, the compactor 1 is adapted to apply an upward force for compacting the desiccant 11 within the canister 10 between the scrubber and the canister's upper end 22 and, through the desiccant, applying the compacting force of the compactor to press or urge the canister in an upward or seating direction and compress the gasket 23 between the canister's upper end 22 and the seat 24 therefor in the housing, thus ensuring against or inhibiting any leakage of entering compressed gas therepast between the inlet and outlet ports 4 and 5.

For enabling the compactor 1, in applying or exerting pressure on the desiccant 11 and therethrough the canister 10, to react downwardly or oppositely against the housing 2, the cup 29 is seated or socketed in an upwardly opening, suitably cylindrical central socket 36 in a mounting block 37 seated from within in the sump 26 and containing below and separate from the socket the drain port or opening 6 of the housing 2. The drain port opens onto or communicates with the sump 26 through suitably cresent-shaped apertures 38 each at the bottom of one of the sectors 39 into which the suitably conical lower part of the sump 26 is divided by radially projecting slots 40 in which seat or are received radial arms or abutments 41 of the mounting block 37 through which the block is bolted or otherwise releasably secured in the housing 2.

Connected at the bottom and top, respectively to the drain port 6 by a supply passage 42 and to atmosphere by a bleed passage 43, the valve chamber 28, during the filtering cycle of the filter unit 3, is open to receive from the drain port actuating gas below the head 30 of the piston 31 for urging the piston upwardly or in a downstream direction in terms of the flow of compressed gas through the filter unit 3, while eliminating resistance by back pressure to upward movement of the piston by bleeding or venting gas above the piston head to atmosphere through the bleed passage 43. Once charged or pressurized, the pneumatic compactor 1 is prevented from being accidentally discharged during a regenerating cycle of the filter unit 3 by a check valve 44 in the supply passage 42, while adapted for intentional discharge through the same passage during a regenerating cycle by manual actuation of a plunger 45 to open or unseat the check valve.

Conveniently attached to the housing's lower part 8 by interiorly accessible bolts 46, the compactor 1 is readily removable as a unit from the lower part on detachment of the latter from the upper part 7 in gaining access to the central bore 9 for periodic inspection of the canister 10 and its contents. Then in a discharged or deenergized condition, the compactor 1, once the filter unit 3 has been reassembled, will automatically be recharged or reenergized in the unit's next filtering cycle.

From the above detailed description it will be apparent that there has been provided an improved pneumatic compactor for compacting a particulate desiccant or other particulate material, which depends for compacting the material on the availability of actuating compressed gas, is proof against accidental while adapted for intentional discharge and, as applied to a unit containing the particulate material in a canister, is capable of utilizing the compacting pressure applied to the particulate material for maintaining sealing engagement between the canister and the unit's housing. It should be understood that the described and disclosed embodiment is merely exemplary of the invention and that all modifications are intended to be included that do not depart from the spirit of the invention and the scope of the appended claims.

Having now described my invention, I claim:

1. In a compressed gas filter assembly, the combination, with a filter unit having a housing removably seating between inlet and outlet ports thereof an open-ended canister containing a desiccant for selectively adsorbing a contaminant from gas passing therethrough between said ports, of sealing means between a downstream end of said canister and a seat therefor in said housing for sealing between said ports, and a pneumatic compactor comprising piston means actuated by compressed gas for applying force to said desiccant and therethrough on said canister for respectively compacting said desiccant and pressing said sealing means between said canister and housing for sealing between said ports.

2. The combination of claim 1, wherein the piston means acts on the desiccant in a direction to urge the canister into the seat therefor in the housing for concurrently compacting said desiccant and by applying therethrough pressure in a seating direction on said canister maintaining a seal between said ports.

3. In a compressed gas filter assembly, the combination with a filter unit including a housing having inlet and outlet ports and a seat therebetween for removably seating an open-ended canister containing a desiccant for absorbing a contaminant desiccant from gas passing therethrough between said ports, of resilient gasket means between said seat and an adjoining end of said canister and compressible therebetween on pressing of said canister in a seating direction for sealing between said ports, and a pneumatic compactor comprising piston means actuated by compressed gas and acting in a canister-seating-direction on said desiccant for compacting said desiccant and therethrough compressing said gasket means between said canister and seat for sealing between said ports.

4. The combination of claim 3, wherein the piston means is automatically actuated by compressed gas during a filtering cycle of the filter unit for applying the compacting force to the desiccant and therethrough sealing pressure on the canister.

5. The combination of claim 4, wherein the piston means includes valve means normally preventing release of actuating gas from said piston means during a draining cycle of said unit.

6. The combination of claim 5, wherein the compactor is mounted in and insertable into and removable from said housing as a unit on separation of the housing into removably connected parts.

* * * * *